United States Patent

[11] 3,627,416

[72] Inventor Harold R. Benson
Lombard, Ill.

[21] Appl. No. 864,293
[22] Filed Oct. 2, 1969
[45] Patented Dec. 14, 1971

[73] Assignee The Nurac Company
Chicago, Ill.

[54] TWIN-EXPOSING MACHINE
7 Claims, 6 Drawing Figs.

[52] U.S. Cl. .......... 355/89, 355/91, 355/94, 355/113
[51] Int. Cl. .......... G03b 27/04
[50] Field of Search .......... 355/89, 85, 91, 94, 99, 113, 115

[56] References Cited

UNITED STATES PATENTS

| | | | |
|---|---|---|---|
| 2,481,694 | 9/1969 | Schubert et al. .......... | 355/48 |
| 3,479,121 | 11/1969 | Burgess .......... | 355/85 |

FOREIGN PATENTS

| | | | |
|---|---|---|---|
| 989,897 | 1951 | France .......... | 355/91 |

*Primary Examiner*—Samuel S. Matthews
*Assistant Examiner*—Richard L. Moses
*Attorney*—Mason, Kolehmainen, Rathburn & Wyss

ABSTRACT: A twin-exposure machine for use in chemical milling, printed circuit work, photographic plates and the like. The twin-exposing machine includes a cabinet containing one or more light sources. A generally horizontally extending track extends through opposite ends of the cabinet and a pair of printing frames is each mounted for travel on the track between a first exposing position within the cabinet and a second position out of the cabinet. Thus one frame may be loaded while the other is being exposed. The frame that is ready for exposure is pushed in manually and a circuit is closed which readies the exposure lights. Upon completion of the exposure, the frame is retracted automatically from the exposure position.

INVENTOR
HAROLD R. BENSON
by
Mason, Kolehmainen, Rathburn and Wyss
ATTORNEYS.

INVENTOR
HAROLD R. BENSON by
Mason, Kolehmainen, Rathburn and Wyss
ATTORNEYS.

INVENTOR
HAROLD R. BENSON
by Mason, Kolehmainen, Rathburn and Wyss
ATTORNEYS.

TWIN-EXPOSING MACHINE

The present invention relates to exposure machines, and more particularly relates to contact printing apparatus useful in exposing sensitized metallic plates. The unit is particularly suitable for exposing positive and negative photoresists such as in chemical milling, printed, microminiature and integrated circuit production.

Earlier exposure apparatus available commercially generally provides for loading in one side only of the printing frame, so that the operator of the printer must first load the frame with the plate and negative material, then position the loaded frame into the exposure device, energize the light source to exposure intensity, and then wait for completion of the exposure. One improvement of this process is described and claimed in U.S. Pat. No. 3,266,402 granted to the applicant of the present invention. The invention described in U.S. Pat. No. 3,266,402 provides an exposure apparatus having a printing frame mounted for pivotal movement about a central axis of the frame thereby to permit the positioning of the frame with either side thereof facing toward the light source. Advantageously one side of the frame may be exposed while the other side of the frame is accessible for loading the next sensitized materials.

In certain of the exposure work, such as that known as chemical milling, it is desired to expose the frame from both the top and bottom simultaneously. Thus the pivoted frame is not adapted for exposure from both sides simultaneously. Moreover in order to minimize idle time of the operator, it is desirable that the exposing source be brought to exposing intensity immediately upon actuation thereof, and that upon completion of the exposure the sensitized materials are removed from the source of exposure.

Accordingly an object of the present invention is to provide a new and improved exposing machine for exposing sensitized materials and which provides the above-mentioned advantages.

A further object of the present invention is the provision of a new and improved contact printer for sensitized material which will permit exposing both sides of a frame simultaneously.

Yet a further object of the present invention is the provision of twin-exposing machine which conveniently provides for loading sensitized materials into one frame while another frame is in the exposure position.

Yet a further object of the present invention is the provision of a new and improved twin-exposing machine.

Briefly, the above and further objects are realized in accordance with the present invention by providing a twin-exposing machine including a cabinet having upper and lower light sources mounted therein for directing light toward a central, generally horizontal track of the machine. The track extends out opposed ends of the machine and carries a pair of printing frames, each mounted on the track for travel between an exposing position within the cabinet, and a loading position out of a respective end of the cabinet. A frame in exposing position can be exposed either from the top or from both sources. A suitable motor is mounted adjacent the track so that when exposure of one frame is complete, the motor is automatically energized and the frame is retracted from the exposure position. While one frame is being exposed, the other frame may be loaded and a rapid exposure operation can occur. The frame that is ready for exposure may be pushed in manually along the track to the exposure position and when it is entirely pushed in a circuit is closed which readies the exposure means. Exposure may be controlled either manually or by a timer.

Advantageously suitable control circuitry is provided for the lamps (top and bottom lamps) so that the lamp intensity is reduced when the lamp is not in use, but the lamp is thereby kept warm so that the delay from warmup is minimized at the next exposure. In addition cooling fans directed against the lamps are turned off during starting of the lamps thereby to minimize the starting time thereof.

Further objects and advantages of the present invention will become apparent as the following description proceeds and the features of novelty which characterize the invention will be pointed out with particularity in the claims annexed to and forming a part of this specification.

Figure 1:
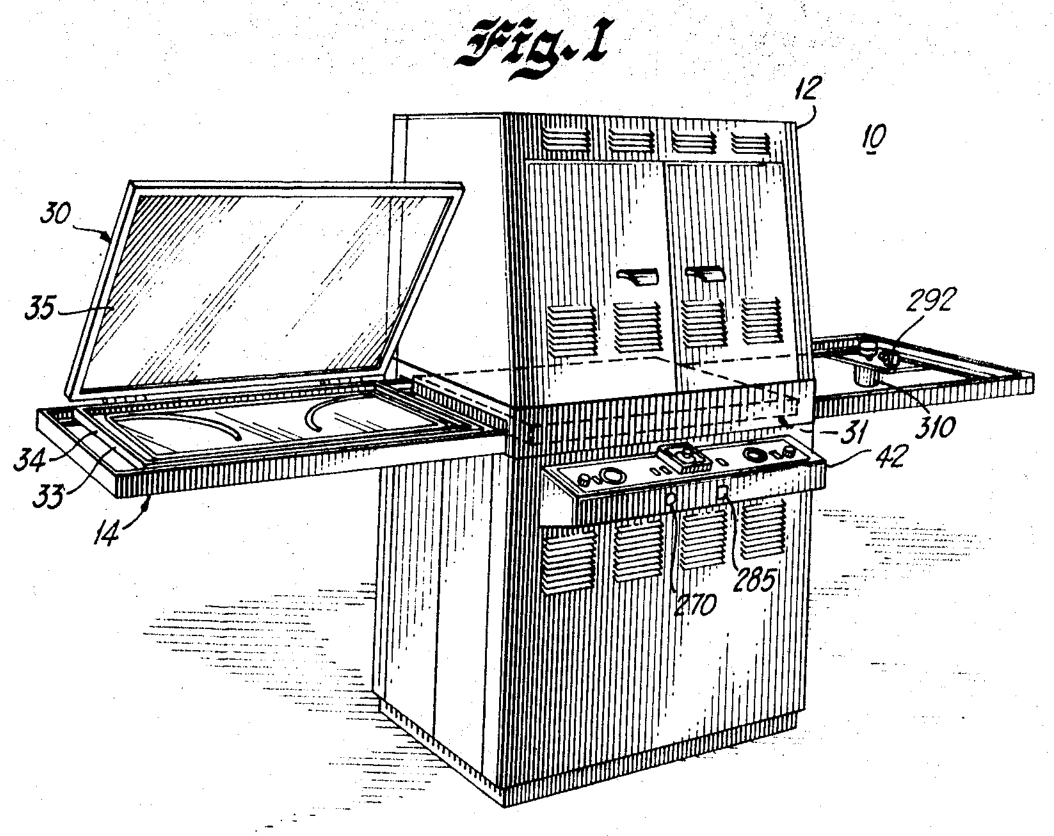
FIG. 1 is a perspective view of the twin exposure machine according to the present invention.
Figure 2:
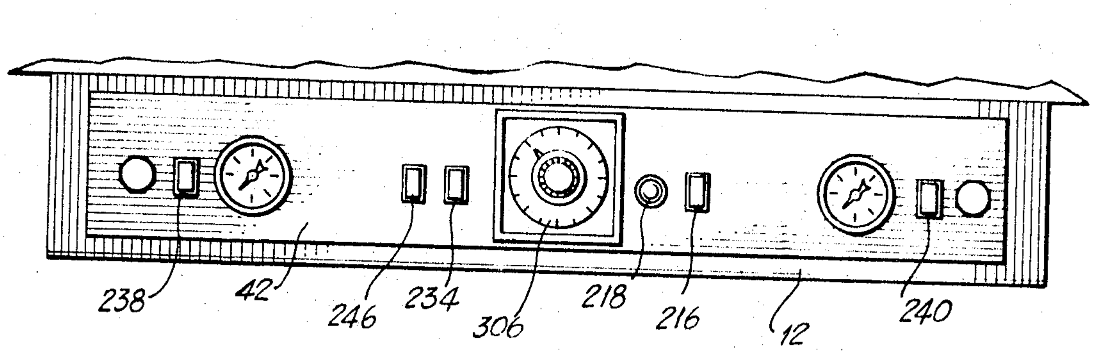
FIG. 2 is a plan view of the control panel of the machine of FIG. 1.

Referring now to the drawings, and particularly to FIGS. 1 through 6 thereof, there is illustrated a twin-exposing machine 10 according to the present invention. The exposing machine 10 includes a cabinet 12 with a track assembly 14 extending through the cabinet 12 intermediate thereof, projecting out opposed sides thereof. Within the cabinet 12 is positioned upper and lower light sources 16 and 17, each having a reflector 19 and 20 and a suitable light, such as a high-pressure mercury lamp 22 and 23. Upper and lower lamp cooling fans 25 and 26 are provided directing cooling air against the lamps 22 and 23. In addition a pair of exhaust fans 28 is provided for continuously exhausting the cabinet 12, being located between the upper and lower lamps 22, 23 and the track assembly 14.

Figures 3, 4, 5:
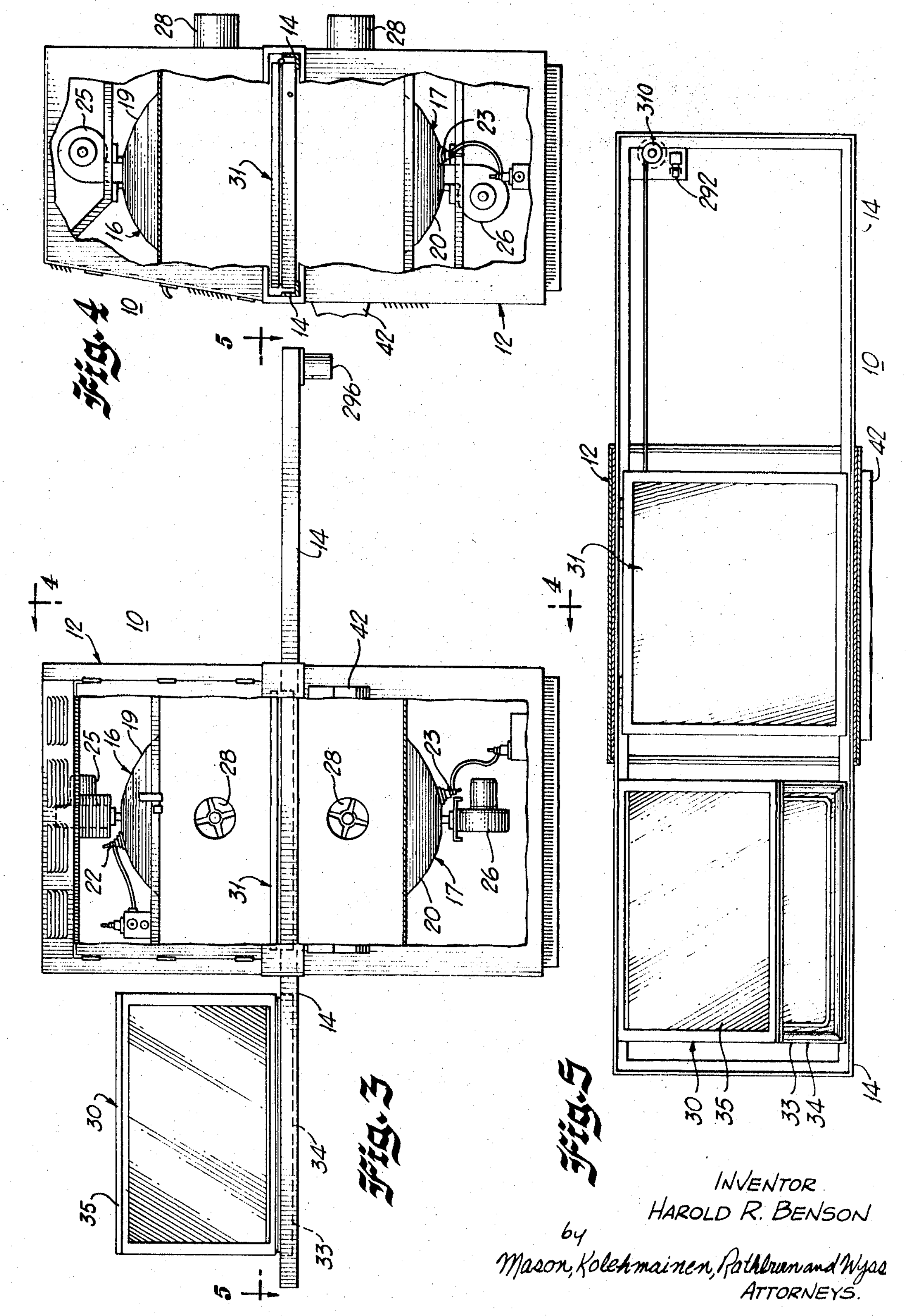
FIG. 3 is a fragmentary view of the twin-exposing machine of FIG. 1, drawn to a larger scale, illustrating the internal arrangement of the device.
FIG. 4 is a plan view of the twin-exposing machine of FIG. 1.
FIG. 5 is a broken away end view of the twin-exposing machine of FIG. 1.

The track assembly 14 projects from opposite sides of the cabinet 12 and carries a pair of trays or frames 31 and 31 mounted on the track assembly 14 so that either tray may be slid into exposing position, as indicated in FIG. 3. The frames 30 and 31 may be of any suitable type, and may be of the type more fully described in the above-mentioned patent. However, briefly, as herein disclosed, the frames 30 and 31 are each of the two-sided vacuum frame type, including a lower translucent cover 33, FIG. 1, intermediate vacuum blanket 34, and an upper translucent cover 35. Work may be loaded into each of the frames 30 and 31 on each side of the vacuum blanket, or if preferred on the upper side only. The blanket is of the two-sided vacuum type. After loading and closing of the covers, vacuum may be drawn on the blanket to provide pull down and contact of the loaded materials. Suitable vacuum may be drawn on each of the frames 30, 31 by means of vacuum pumps, schematically illustrated in FIG. 6 at 38 and 39, connected to the vacuum blanket 34 of the respective frames by suitable vacuum hose.

It will be understood that either both sides may be exposed simultaneously, or that the upper side alone of a frame may be exposed within the cabinet 12. The powerful lamps 22 and 23 provide substantially point light to provide for rapid and sharp exposure. In operation it will be understood that one frame, such as frame 30, may be loaded while the other frame is being exposed. Upon completion of the exposure, the frame will be automatically ejected from the exposure cabinet 12 and the intensity of the exposure lamps will be reduced to the standby condition.

Figure 6:
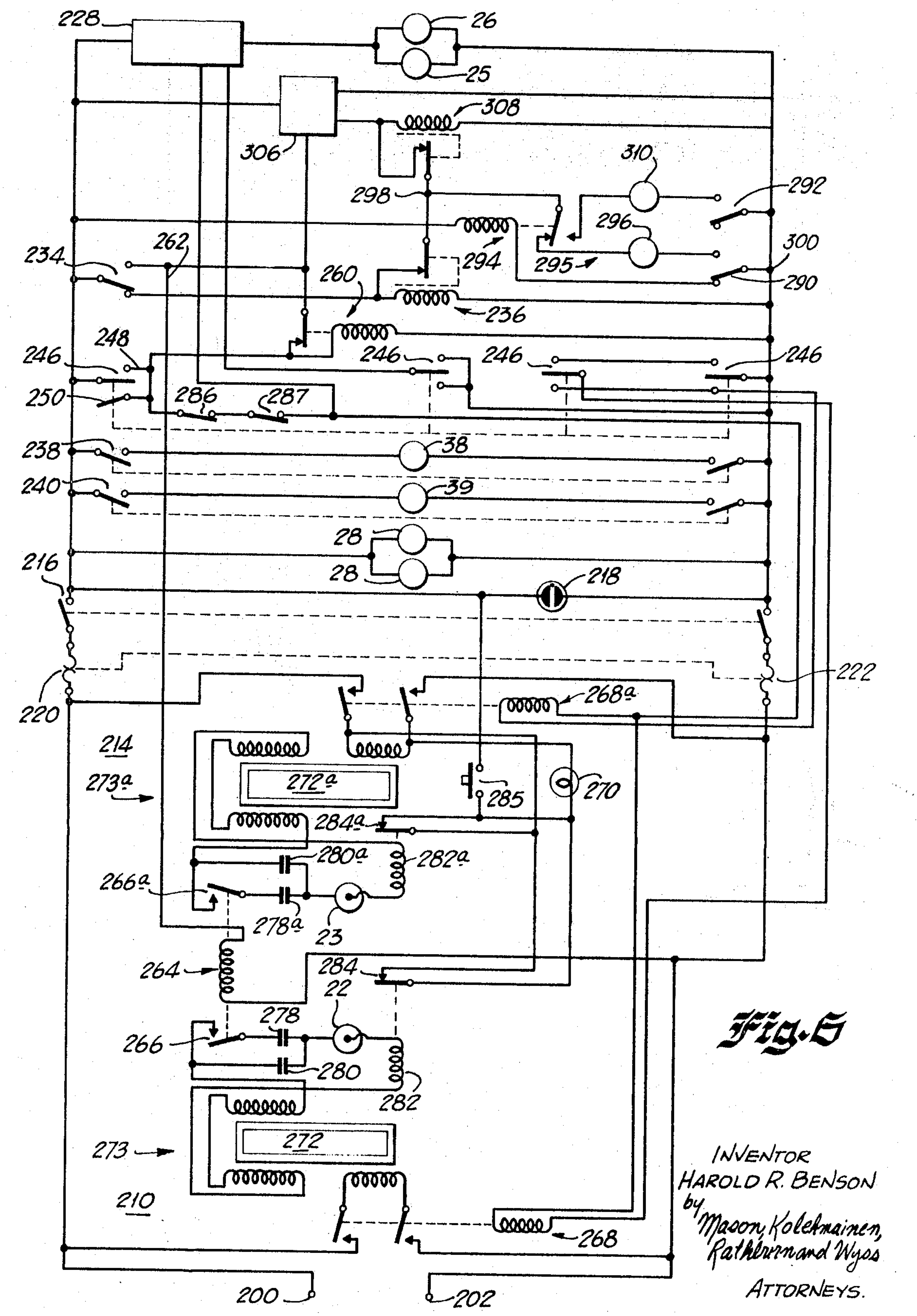
FIG. 6 is a schematic view of the control circuitry for the twin-exposing machine.

More specifically, referring to FIG. 6, therein is shown the schematic diagram for the twin-exposing machine 10 in which all the relays and switches are shown in a normally off condition before the unit is turned on. As illustrated, in a specific commercial embodiment, the machine is operated by 60 cycle single phase terminal voltage impressed across input terminals 200 and 202 with a design voltage in the range from 208 to 240. The upper lamp 22 is controlled by a power supply 210 and the lower lamp 23 is controlled by a power supply 214. The lamps 22 and 23 are in a low-intensity condition when the machine is in standby and not being used for exposing and a high-intensity condition when the lamps 22 and 23 are being initially started or when an exposure is being made.

The machine is turned on by closing a switch 216 located on a control panel 42 of the machine. A pilot light 218, also located on the control panel, indicates when the unit is on. Circuit breakers 220 and 222 protect the unit from any faults that may occur during operation. Upon the closing of the switch 216, exhaust fans 28 are simultaneously activated to circulate air within the unit. A relay 228 connects the lamp-cooling fans 25 and 26 to the input terminals 200 and 202 so that the lamp-cooling fans 25 and 26 are also turned on upon the closing of switch 216.

A manual expose switch 234 is in an initial off position so that a time-delayed relay 236 is energized causing the relay 236 to open after an elapsed time, for example, of approximately 7 seconds from the closing of switch 216. Switches 238 and 240, also located on the control pane of the unit, control the vacuum pumps 242 and 244 to establish the proper vacuum pressure in the left and right frames as required.

After the initial starting of the unit a lamp selector switch 246 located on the control panel of the unit is closed. The switch 246 can be closed against a terminal 248 or a terminal 250. When switch 246 is closed against the terminal 248, only the upper power supply 210 controlling lamp 22 is activated. Upon closing switch 246 against the terminal 250, both the upper power supply 210 and the lower power supply 214 are energized turning on both lamps 22 and 23.

To illustrate the operation of the unit, the switch 246 is assumed to be closed against terminal 248 so that only lamp 22 is turned on. Power supply 214 is similar to power supply 210 and the corresponding parts are indicated by the same reference numbers followed by the letter *a*.

A time-delayed relay 260 is closed initially, and power is supplied through relay 260 and conductor 262 to coil 264 when switch 246 is activated so that a capacitor contact 266 is closed. Simultaneously with the closing of capacitor contact 266, a relay 268 is closed connecting the upper power supply 210 to terminals 200 and 202. In addition, relay 228 opens deactivating blowers 25 and 26 so that the blowers 25 and 26 do not retard the starting of either lamp 22 or lamp 23. Upon opening of the relay 268, a lamp-warning light 270 located on the upper front of the unit is shut off so as to show that the lamp 22 is now operating.

The closing of the relay 268 also energizes a transformer 272 activating the lamp.

Since the contact 266 is closed by the initial closing of the switch 246, a capacitor 278 is in parallel relation with a capacitor 280. The parallel combination of capacitors 278 and 280 is in turn in series relation with the lamp 22 and the transformer 272 forming a lamp circuit 273. The inclusion of the capacitor 278 in the lamp circuit 273 decreases the impedance of the lamp circuit 273 so that the lamp 22 is at full intensity. When the lamp 22 is operating, a relay 282 is energized opening contacts 284 so that warning light 270 is turned off. Therefore, the warning light 270 indicates that the lamp 22 is not operating so that no faulty exposures can occur. A test switch 285 is provided to test the operation of light 270.

After an elapsed time, for example, of approximately 50 seconds from the closing of switch 246, relay 260 opens, deenergizing the coil 264 and opening the contact 266. The capacitor 278 is removed from the lamp circuit 273 increasing the impedance of the circuit 273 and reducing the intensity of the lamp 22.

To insure the safety of an operator, safety switches 286 and 287 deactivate the lamps 22 and 23 when the doors to the cabinet are opened.

After one of the frames 30 or 31 has been loaded, such as the left frame 30, FIGS. 1 and 3, the operator moves the frame into the cabinet for exposure. If the left frame is moved, a limit switch 290 is released so that the switch 290 changes to an alternate position. If the right frame is inserted to be exposed, a limit switch 292 is changed to an alternate position. Assuming that the left frame is to be inserted, the release of limit switch 290 to its alternate position deenergizes a transfer relay 294 so that a circuit 295 is established across a left eject motor 296 between terminals 298 and 300. However, since the time-delay relay 236 is open, no energy is supplied to the motor 296 so that the frame is not ejected as soon as it is inserted for exposure.

Timing of the exposure may be manual or automatic. Assuming the exposure is to manual, the operator moves a manual expose switch 234 to its alternate position so that the coil 264 is again energized through the conductor 262 closing the contact 266 causing the lamp 22 to be again in a full intensity condition. The manual expose switch 234 remains in the alternate position for the required length of time for exposure. A timer 306 can also be used for automatically timing the exposure and accomplishes the same energization of coil 264 through conductor 262 and controls relay 308 which is in parallel with relay 236.

When the exposure is completed, the manual switch 234 is returned to its initial position. The coil 264 is deenergized and the capacitor 278 is removed from the lamp circuit 273 so that lamp 208 is reduced to a low-intensity state. Upon the return of manual expose switch 234 to its initial position, energy is supplied to the left eject motor 296 through the closed relay 236 and transfer relay 294 so that the left eject motor 296 automatically removes the left frame from the unit. As the frame is completely removed, the limit switch 290 is returned to its initial position, and the left eject motor 296 is deenergized. Even if the limit switch 290 is returned to its alternate position by a further movement of the left frame, the left eject motor 296 is not reactivated since the relay 236 opens after a time delay of approximately 7 seconds of energization. A similar procedure involves a right eject motor 310 by the closing of limit switch 292.

To shut down the machine 10, allow lamp selector switch 246 is returned to its initial off position so that relay 268 is deenergized and the upper power supply 210 is deactivated. Upon the return of switch 246 to its initial off position, the blowers 25 and 26 are turned on through the now closed relay 228 so that the lamps 22 and 23 are more readily cooled. Vacuum is released from the frame to remove the exposed material. Upon a sufficient time to allow the blowers 25 and 26 to cool the lamps 22 and 23, the master switch 204 may be opened, and the unit is deenergized as indicated by the turning off of light 218.

From the above-detailed description, the operation of the improved twin-exposing machine is believed clear. However, briefly, it will be understood that either of the frames 30 or 31 may be loaded while the other of the frames may be in the process of being exposed. Moreover each of the frames 30 and 31 may be loaded for exposure through its upper cover 35 or simultaneously through both covers 35 and 33. Upon the loading of one frame, here shown as the right frame 31, the frame is manually pushed into the cabinet of the twin exposing machine 10 for exposure. The operator may select exposure by the top lamp 22 or by both lamps 22 and 23 simultaneously depending upon the requirements for use. In certain application such as for chemical milling exposure, it is generally desired or necessary to expose both sides. Consequently the operator will set the lamp selector switch 246 to both sides. In other applications such as printed circuitry only one side need be exposed. In this instance the lamp selector switch 246 will be set to the upper lamp 22.

In sequence to operate the twin exposure machine 10, the machine 10 is first turned on by the master switch 216. At this time both lamp-cooling blowers 25 and 26 will be energized. It is understood that the lamp-cooling blowers 25 and 26 are running whenever the lamp selector switch 246 is in the off position. The exhaust fans 28 will also be turned on, these fans both running whenever the master switch is closed. After a suitable time delay, such as 7 seconds, the relay 236 will open.

In accordance with the requirements of the exposure, the operator will select either the upper or both lamps. At this time the lamp-cooling blowers 25 and 26 will turn off. Simultaneously the second capacitor 278, 278*a* of the selected lamp or lamps will be connected into the lamp circuits. The relays 268 and 268*a* will close turning on the lamp power supplies.

The selected lamps will be energized to full intensity for a given period, such as for 50 seconds, at which time relay 260 opens and the lamps returned to their standby intensity.

Upon loading of the frame, the operator will push the frame into the expose position in the cabinet 12. Assuming that the right frame 31 has been loaded, the right limit switch 290 will flip to its alternate position illustrated in FIG. 5. The operator now exposes the frame, either manually through the manual expose switch 234 or automatically through the timer 306. At this time the second capacitor 278 or 278a is brought into the circuit and light comes up to full intensity. After a suitable time delay, such as 7 seconds, the relay 236 or 308 will close.

Upon completion of the exposure, either by the opening of the manual expose switch 234 or the timing out of the timer 306, the respective eject motor 296 will retract the frame. The frame will be withdrawn until it strikes its limit switch 290 at which time the eject motor will stop and the transfer relay 294 will flip. Thereafter the time-delay relay 236 or 308 will open.

At this time the machine 10 is in condition for exposure of the opposite or left frame 30.

Advantageously the present twin-exposing machine provides for exposure of one printing frame while the other frame is being loaded. The two double-sided vacuum frames provide for exposure of the upper surface only, or exposure of both sides of the frame simultaneously. The two independent vacuum pumps provide fast vacuum pull down and superior contact of the materials to be exposed. The power circuit in use with a mercury vapor lamp provides light in a desirable spectrum range, for example, in the range of 3,600 to 4,500 angstroms, and thus provides a fast exposure source. Only one warmup cycle at the beginning of the day is required. During the remainder of the time the light source is at standby, ready to give full intensity exposures instantaneously. Moreover at the end of the exposure cycle, whether manual or automatic, the exposed frame is automatically ejected from the exposure chamber and provides the precise timing control needed for precision exposures.

What is claimed as new and desired to be secured by Letters Patent of the United States is:

1. A twin-exposing machine for use in exposing sensitized materials and the like comprising:
 a cabinet;
 light source means mounted in said cabinet;
 track means extending generally horizontally entirely through said cabinet and out opposite ends thereof; and
 a pair of separately manipulated printing frames each mounted for travel on said track between a first exposing position within said cabinet and a second position out of said cabinet.

2. An exposing machine as set forth in claim 1 wherein said light source means includes a pair of exposing lamps respectively mounted within said cabinet above and below said track.

3. An exposing machine as set forth in claim 2 including means for energizing one of said lamps to exposing level and for energizing both of said lamps simultaneously to exposing level.

4. An exposing machine as set forth in claim 1 including means for automatically retracting a frame from exposing position upon completion of exposure thereof.

5. A twin exposing machine for use in exposing sensitized materials and the like comprising:
 a cabinet;
 track means extending generally horizontally through said cabinet and out opposite ends thereof;
 a pair of printing frames each mounted for travel on said track between a first exposing position within said cabinet and a second position out of said cabinet in opposed directions;
 light source means including a pair of exposing lamps respectively mounted within said cabinet above and below said exposing position;
 retracting means for retracting a frame from said exposing position;
 power supply means for energizing said light source means to an exposing level for an exposure period of time; and
 means operatively connected to said power supply means for actuating said retracting means upon expiration of said exposure period.

6. An exposing machine as set forth in claim 5 including means operatively associated with said light source means for maintaining said light source means at a reduced standby intensity level at times other than said exposure periods of time.

7. A twin-exposing machine for use in exposing sensitized materials and the comprising:
 a cabinet;
 light source means mounted in said cabinet;
 track means extending entirely through said cabinet; and
 a pair of printing frames each mounted for travel on said track means between a first exposing position within said cabinet and a second position out of said cabinet, each of said frames being mounted for movement out of said cabinet in opposed directions.

* * * * *

PO-1050
(5/69)

UNITED STATES PATENT OFFICE
CERTIFICATE OF CORRECTION

Patent No. 3,627,416 Dated Dec. 14, 1971

Inventor(s) Harold R. Benson

It is certified that error appears in the above-identified patent and that said Letters Patent are hereby corrected as shown below:

On the first page of the patent, opposite [73] Assignee The "Nurac" Company should read --nuArc--

Signed and sealed this 30th day of May 1972.

(SEAL)
Attest:

EDWARD M.FLETCHER,JR.
Attesting Officer

ROBERT GOTTSCHALK
Commissioner of Patents